United States Patent
Peled et al.

(10) Patent No.: US 8,533,441 B2
(45) Date of Patent: Sep. 10, 2013

(54) METHOD FOR MANAGING BRANCH INSTRUCTIONS AND A DEVICE HAVING BRANCH INSTRUCTION MANAGEMENT CAPABILITIES

(75) Inventors: Yuval Peled, Kiryat-Ono (IL); Itzhak Barak, Kadima (IL); Uri Dayan, Herzelia (IL); Idan Rozenberg, Ra'Anana (IL); Yoram Salant, Tel Aviv (IL)

(73) Assignee: Freescale Semiconductor, Inc., Austin, TX (US)

( * ) Notice: Subject to any disclaimer, the term of this patent is extended or adjusted under 35 U.S.C. 154(b) by 1081 days.

(21) Appl. No.: 12/190,291

(22) Filed: Aug. 12, 2008

(65) Prior Publication Data
US 2010/0042811 A1    Feb. 18, 2010

(51) Int. Cl.
*G06F 9/30* (2006.01)
(52) U.S. Cl.
USPC .......................................................... 712/239
(58) Field of Classification Search
USPC .......................................................... 712/239
See application file for complete search history.

(56) References Cited

U.S. PATENT DOCUMENTS

| | | | | |
|---|---|---|---|---|
| 5,542,109 A | * | 7/1996 | Blomgren et al. | 712/234 |
| 6,157,998 A | | 12/2000 | Rupley, II et al. | |
| 6,519,730 B1 | | 2/2003 | Ando et al. | |
| 7,096,348 B2 | | 8/2006 | Moyer et al. | |
| 7,257,698 B2 | | 8/2007 | Kawaguchi | |
| 2003/0182539 A1 | * | 9/2003 | Kunkel et al. | 712/225 |
| 2005/0071614 A1 | * | 3/2005 | Jourdan et al. | 712/239 |

* cited by examiner

*Primary Examiner* — Robert Fennema

(57) ABSTRACT

A method for managing branch instructions, the method includes: providing, to pipeline stages of a processor, multiple variable length groups of instructions; wherein each pipeline stage executes a group of instruction during a single execution cycle; receiving, at a certain execution cycle, multiple instruction fetch requests from multiple pipeline stages, each pipeline stage that generates an instruction fetch request stores a variable length group of instructions that comprises a branch instruction; sending to the fetch unit an instruction fetch command that is responsive to a first in order branch instruction in the pipeline stages; wherein if the first in order fetch command is a conditional fetch command then the instruction fetch command comprises a resolved target address; wherein the sending of the instruction fetch command is restricted to a single instruction fetch command per a single execution cycle.

20 Claims, 4 Drawing Sheets

```
┌─────────────────────────────────────────────────────────────────────────────┐
│ Providing, to pipeline stages of a processor, multiple variable length groups of instructions. │
│ Each pipeline stage executes a group of instruction during a single execution cycle. 310 │
└─────────────────────────────────────────────────────────────────────────────┘
                                        │
┌─────────────────────────────────────────────────────────────────────────────┐
│ Generating one or more instruction fetch requests. An instruction fetch request can be sent │
│           by each pipeline stage that stores a branch instruction. 320      │
└─────────────────────────────────────────────────────────────────────────────┘
                                        │
┌─────────────────────────────────────────────────────────────────────────────┐
│           Receiving, by a controller, the one or more instruction fetch requests 330 │
└─────────────────────────────────────────────────────────────────────────────┘
                                        │
┌─────────────────────────────────────────────────────────────────────────────┐
│ Updating status information indicative of the order of branch instructions that are stored in │
│                           the pipeline stages. 340                           │
└─────────────────────────────────────────────────────────────────────────────┘
                                        │
┌─────────────────────────────────────────────────────────────────────────────┐
│ Determining whether the first in order branch instruction is a conditional branch instruction │
│ and whether the condition associated with the first in order branch instruction was fulfilled. │
│                                    350                                       │
└─────────────────────────────────────────────────────────────────────────────┘
                                        │
┌─────────────────────────────────────────────────────────────────────────────┐
│  Propagating one or more variable length groups of instructions through the pipelined │
│                                 stages. 360                                  │
└─────────────────────────────────────────────────────────────────────────────┘
                                        │
┌─────────────────────────────────────────────────────────────────────────────┐
│ Determining whether a speculative target address (generated by the branch prediction unit) │
│                           was right or not. 370                              │
└─────────────────────────────────────────────────────────────────────────────┘
                                        │
┌─────────────────────────────────────────────────────────────────────────────┐
│ Sending to the fetch unit an instruction fetch command. The instruction fetch command can │
│                    include a resolved target address. 380                    │
└─────────────────────────────────────────────────────────────────────────────┘
                                        │
┌─────────────────────────────────────────────────────────────────────────────┐
│  Flushing instructions that followed the mispredicted branch instruction. A mispredicted │
│  branch instruction is a conditional branch instruction that was erroneously predicted by the │
│                           branch prediction unit. 390                        │
└─────────────────────────────────────────────────────────────────────────────┘
```

METHOD FOR MANAGING BRANCH INSTRUCTIONS AND A DEVICE HAVING BRANCH INSTRUCTION MANAGEMENT CAPABILITIES

FIELD OF THE INVENTION

The present invention relates to a method for managing branch instructions and a device having branch instruction management capabilities.

BACKGROUND OF THE INVENTION

Branching (including conditional branching and unconditional branching) causes a change of flow. The change of flow includes flushing pipeline stages of a processor. The penalty associated with the flushing is responsive to the depth of the pipeline. In order to reduce this penalty many processors perform branch prediction.

Branch prediction attempts to estimate whether a condition associated with a conditional branch will be fulfilled or not. In case of unconditional branch instructions the prediction is very simple—the outcome of the prediction is included in the unconditional branch instruction. A branch prediction unit generates predicted target addresses. A predicted target address can be a speculative target address if it is associated with an unresolved conditional branch instruction.

Instructions that are located at the speculative target address (and addresses that follow the speculative target address) are fetched to the pipeline stages. The correctness of the branch prediction (correctness of the speculative target address) is checked (resolved) at the last pipelined stages—after multiple instructions were already processed by one or more pipeline stages.

A conditional branch instruction can be responsive to one or more conditions. Multiple conditional branches can be dependent upon the same condition. After the condition is resolved its state (for example—true or false) can be flagged by a condition flag.

A pipeline stage that stores (and additionally or alternatively processes) a branch request can send to the fetch unit an instruction fetch request. If, at a certain point in time, multiple pipeline stages store branch instructions then the fetch unit can receive multiple instruction fetch requests. Some of these instruction fetch requests can be responsive to unconditional branch instructions while other instruction fetch requests can be responsive to conditional fetch requests.

If multiple conditional branch requests are associated with the same condition then a single condition flag can be accessed by multiple hardware components. These multiple accesses can cause fan-out problems and result in a reduction of the operational frequency of the processor.

Reducing the number of accesses to the condition flag can be implemented by stalling the propagation of all but a single branch instruction through the pipeline stages but reduces the throughput of the processor.

The following code can be executed by introducing multiple stalls between its commands, especially multiple (for example—five) stalls are introduced between code lines I3 and I4, multiple stalls are introduced between code line I4 and I5, and multiple stalls are introduced between code line I5 and I6.

I1 move (R4),D0 multiply D4,D5,D1
I2 cmpeq D0,D1 multiply D5,D6,D2
I3 jt_I7 cmpeq D2,D3 mutiply D6,D7,D3
I4 jf_I9 cmpeq D6,D7 add D2,D3,D4
I5 jt_I1 move (R4),D0
I6 jmp_I2 move (R5),D1
I7 add D1,D2,D3
I8 move (R5),D9 inc D1
I9 move (R6),D8 inc D2

Alternatively, when this code propagates through pipelined stages four instruction fetch requests can be sent to fetch unit.

SUMMARY OF THE PRESENT INVENTION

The present invention provides a method and a system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

FIG. 3 schematically shows an example of an embodiment of a method; and

DETAILED DESCRIPTION OF THE DRAWINGS

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

It has been shown that fan-out problems and, additionally or alternatively, arbitration between instruction fetch commands can be saved by restricting a provision of instruction fetch commands to the fetch unit to less than two instruction fetch commands per execution cycle. A controller can send an instruction fetch command if it detects an erroneous branch prediction.

It is noted that the term "branch instruction" means an instruction that can cause a change of flow. It includes, for example, hardware loop instructions.

Figure 1:
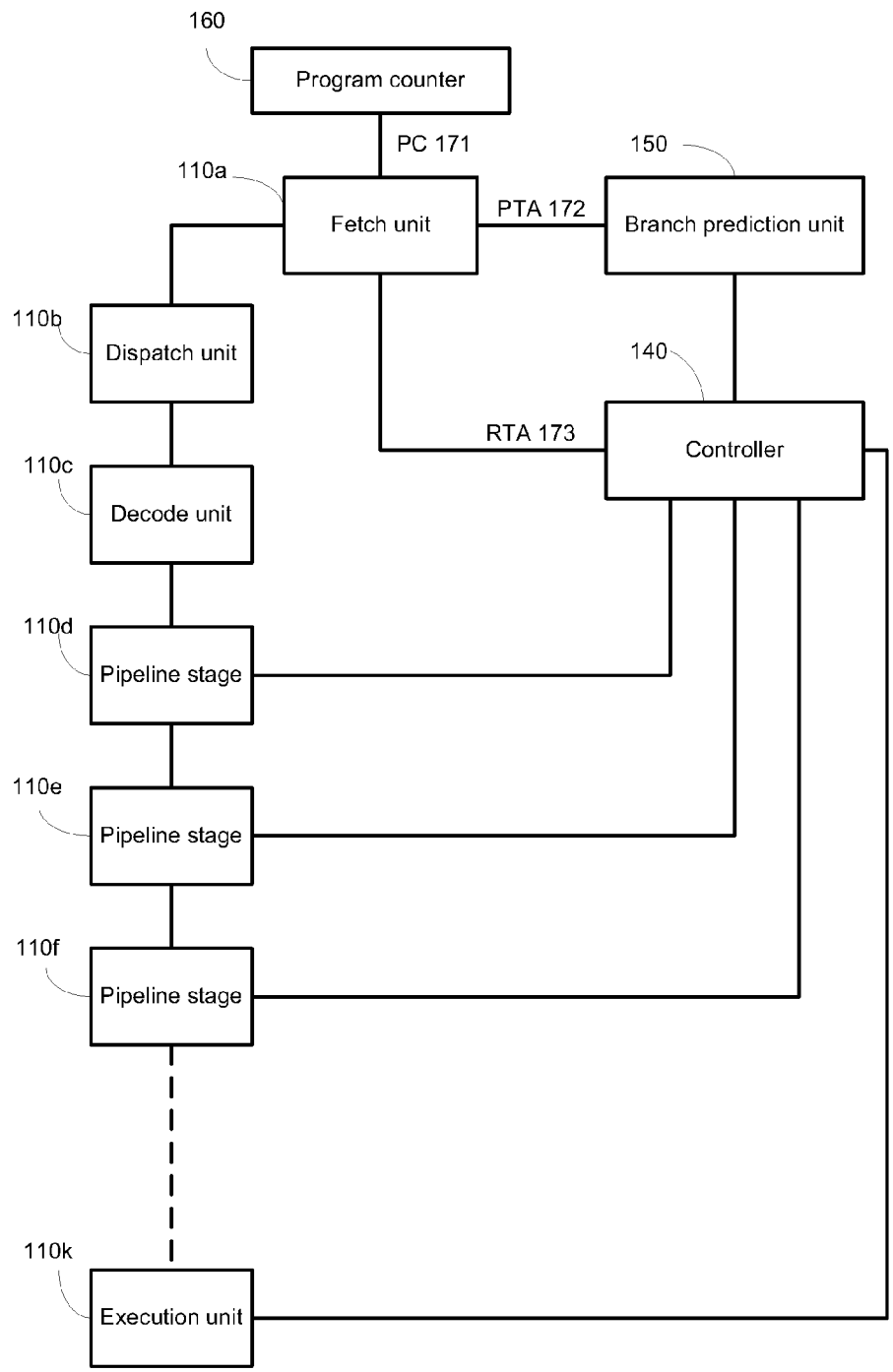
FIG. 1 schematically shows an example of an embodiment of a system.

FIG. 1 schematically shows an example of an embodiment of system 100.

System 100 includes multiple pipeline stages 110a-110k (wherein pipeline stage 110a is a fetch unit), memory unit 130, controller 140, branch prediction unit 150 and program counter 160.

Pipeline stages 110a-110k can belong to multiple cores such as digital signal processing cores, general purpose cores and the like. The processing sequence of an instruction involves processing the instruction by each of the pipeline stages—one pipeline stage after the other. At the end of each execution cycle variable length groups of instructions are sent from one pipeline stage to the other.

The pipeline stages can include (in addition to fetch unit 110a), dispatch unit 110b, decode unit 110c, and additional units such as but not limited to data fetch unit, a memory address calculating unit, and execution unit 110k. The number of pipeline stages can vary from one processor to the other, as well as the maximal length of instruction groups that can be concurrently processed by the processor. Typical pipelines include more than eight pipeline stages. A variable length group of instructions is also referred to as very long instruction word.

Fetch unit 110a is adapted to fetch variable length groups of instructions from memory unit 130. Fetch unit 110a can receive a resolved target address (RTA 173) from controller 140, a predicted target address (PTA 172) from branch prediction unit 150 and can also receive a next program counter value (PC 171) from program counter 160.

Controller 140 generates an instruction fetch command that includes a resolved target address and can also include a branch prediction indication. The branch prediction indication can indicate whether the predicted target address is erroneous or true. The branch prediction indication can be sent to fetch unit 110a but is usually sent to branch prediction unit 150. Branch prediction unit 150 can estimate branch target addresses based upon the branch prediction indication.

Program counter 160 can monotonically count upwards or downwards. It can be updated in response to a branch.

Variable length groups of instructions propagate through pipeline stages 110a-110k and can cause pipeline stages 110d-110k that store branch instructions to generate instruction fetch requests.

Controller 140 can receive, at a certain execution cycle, multiple instruction fetch requests from multiple pipeline stages that store branch instructions if, for example, pipeline stages 110d, 110e and 110f store, at that certain execution cycle, branch instructions, then controller 140 can receive instruction fetch requests from each of these pipeline stages.

Not all pipeline stages can send an instruction fetch request. Pipeline stages 110d (after decoding unit) till 110k can generate an instruction fetch request if they store a branch instruction. Non-conditional branch instructions are detected by decode unit 110c.

Instead of allowing pipeline stages 110d-110k to send instruction fetch requests to fetch unit 110a and, additionally or alternatively, to pole (or otherwise read) one or more condition flags, controller 140 resolves one branch instruction per execution cycle and sends fetch unit 110a up to a single instruction fetch command per execution cycle.

Controller 140 can send an instruction fetch command only if it determines that the speculative target address is wrong.

Figure 2:
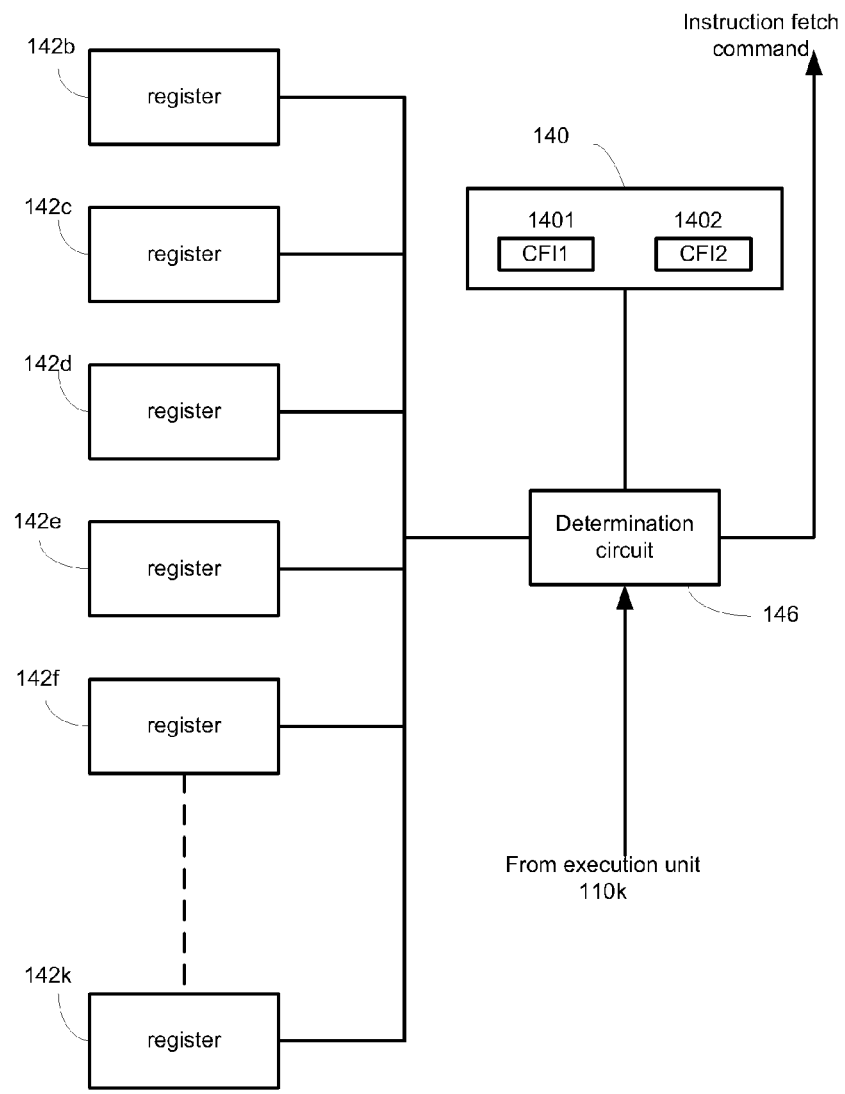
FIG. 2 schematically shows an example of an embodiment of a controller of a system.

FIG. 2 schematically shows an example of an embodiment of controller 140 of system 100.

Controller 140 can determine which branch instruction is the first in order by monitoring and updating status vectors that indicate the number of branch instructions (within pipelined stages 110a-110k) that precede each branch instruction. For example, the first in order branch instruction can be described by an empty (reset) status vector. The second first in order branch instruction can be described by a status vector that includes a single set bit. These status vectors can be stored in registers 142d-142k. Controller 140 can apply various allocation schemes for determining where to store each status vector.

Controller 140 also includes interface 144 for receiving and storing one or more condition fulfilment indication (such as CFI1 1401 and CFI2 1402) that indicate whether one or more conditions associated with a conditional fetch command is fulfilled. The one or more condition fulfilment indications can be generated by an execution unit such as pipeline stage 110k.

Each condition fulfilment indicator and each status vector can include a branch instruction identifier that links it to the relevant branch instruction. Alternatively, a condition fulfilment indicator can include a condition identifier that links it to the condition that has been evaluated. In the latter case controller 140 should link between the condition fulfillment indicator and the branch instructions stored in pipeline stages 110d-110k. For example, the condition fulfillment indicator can be stored in controller 140 until the last branch instruction that is related to this condition is removed from pipeline stages 110d-110k.

In a sense, controller 140 masks information fetch requests related to all but the first in order branch instruction. If, for example, the first in order branch instruction is a conditional branch instruction then the instruction fetch command can be responsive to a condition fulfillment indication that indicates whether at least one condition associated with the conditional fetch command is fulfilled.

If controller 140 determines (based upon the condition fulfillment indication) that that the branch prediction of branch prediction unit was wrong he can send the instruction fetch command and else (if the branch prediction was correct) it can refrain from sending the instruction fetch command, although this is not necessarily so and a instruction fetch command can be sent anyhow. Thus, the instruction fetch command can be sent even if the branch instruction is an unconditional branch instruction.

The status vectors as well as one or more condition resolving indicators are received by determination circuit 146 that can determine whether to send the instruction fetch command and also determines the resolved target address (RTA 183) to be sent to fetch unit 110a. The resolved target address can be taken from the program counter (PC)—the address of the next instruction after a mispredicted branch instruction.

The variable length group of instructions can include various instructions as well as one or more branch commands. A variable length group of instructions can be restricted to include up to a single branch command but this is not necessarily so.

If a branch prediction is found to be erroneous the pipeline stages are flushed from all the instructions that follow the mispredicted branch instruction. Instead of ignoring the results of the execution of these instructions system 100 can stores these results and retrieve them when these currently flushed instructions are later retrieved by system 100.

The following table will illustrate some signals and some status vectors that can be sent when the following code is executed by system 100:

I1 move (R4),D0 multiply D4,D5,D1 {move from address R4 to register D0, multiply D4 and D5 and save result in D1}

I2 cmpeq D0,D1 multiply D5,D6,D2 {compare if D0 and D1 are equal, multiply D5 and D6 and save result in D2}

I3 jt_I7 cmpeq D2,D3 mutiply D6,D7,D3 {branch to I7 if D0=D1, compare if D2 and D3 are equal, multiply D6 and D7 and save the result in D3}
I4 jf_I9 cmpeq D6,D7 add D2,D3,D4
{branch to I9 if D2 not equals D3, compare if D6 and D7 are equal, add D2 to D3 and save the result in D4}
I5 jt_I1 move (R4),D0
{branch to I1 if D6 equals D7, move from address R4 to register D0}
I6 jmp_I2 move (R5),D1
{branch to I2, move from address R5 to register D1}
I7 add D1,D2,D3
{add D1 to D2 and save the result in D3}
I8 move (R5),D9 inc D1
{move from address R5 to register D9, increment D1}
I9 move (R6),D8 inc D2
{move from address R6 to register D8, increment D2}

TABLE 1

| | Instructions/instruction fetch request | | | | | | | | | |
|---|---|---|---|---|---|---|---|---|---|---|
| Time | 110c | 110d | 110e | 110f | 110g | 110h | 110k | PTA | RTA | remark |
| T1 | I3 | I2 | I1 | | | | | I4 | — | predict D0 differs from D1 |
| T2 | I4 | I3 | I2 | I1 | | | | I5 | — | predict D2 = D3 |
| T3 | I5 | I4 | I3 | I2 | I1 | | | I6 | — | predict D6 differs from D7 |
| T4 | I6 | I5 | I4 | I3 | I2 | I1 | | I2 | — | Unconditional |
| T5 | I2 | I6 | I5 | I4 | I3 | I2 | I1 | — | — | — |
| T6 | I3 | I2 | I6 | I5 | I4 | I3 | I2 | — | — | Execute Do ? = D1 |
| T7 | I4 | I3 | I2 | I6 | I5 | I4 | I3 | — | I4 | D0 differs from D1. Resolve only I3. |
| T8 | I5 | I4 | I3 | I2 | I6 | I5 | I4 | — | I5 | D2 = D3. Resolve only I4. |
| T9 | I6 | I5 | I4 | I3 | I2 | I6 | I5 | wrong | I1 | D6 differs from D7. Resolve only I5. |
| T10 | I1 | | | | | | | — | — | Pipeline flushed |

In table 1, an underlined line number (for example I5) indicates that this instruction line can cause a pipeline stage to send an instruction fetch request to controller 140. A tilted, underlined and bold ling number (for example I5) indicates that this code line includes the first in order branch instruction and that this first in order branch instruction is being evaluated by controller 140.

FIG. 3 schematically shows an example of an embodiment of method 300.

Method 300 starts by stage 310 of providing, to pipeline stages of a processor, multiple variable length groups of instructions. Each pipeline stage executes a group of instruction during a single execution cycle. Stage 310 can be executed in a sequential manner by a fetch unit. The fetch unit can receive one or more instructions per execution cycle and can send these instructions to a pipeline stage that follows it.

Stage 310 is followed by stage 320 of generating one or more instruction fetch requests. An instruction fetch request can be sent by each pipeline stage that stores a branch instruction.

Stage 320 is followed by stage 330 of receiving, by a controller, the one or more instruction fetch requests Stage 330 is followed by stage 340 of updating status information indicative of the order of branch instructions that are stored in the pipeline stages. Stage 330 can include updating status vectors of branch instructions. A status vector of a branch instruction indicates a number of branch instructions that precedes that branch instruction.

Stage 340 is followed by stage 350 of determining whether the first in order branch instruction is a conditional branch instruction and whether the condition associated with the first in order branch instruction was fulfilled. Stage 350 can be responsive to a condition fulfillment indication that indicates whether at least one condition associated with the conditional fetch command is fulfilled.

If the answer is negative then stage 350 is followed by stage 360 of propagating one or more variable length groups of instructions through the pipelined stages. Stage 360 is followed by stage 320. It is noted that even if the branch instruction is unconditional then stage 360 can also include sending to the fetch unit an instruction fetch command.

If the answer is positive then stage 350 is followed by stage 370 of determining whether a speculative target address (generated by the branch prediction unit) was right or not. If the speculative target address was erroneous then stage 370 can be followed by stage 380 of sending to the fetch unit an instruction fetch command. The instruction fetch command can include a resolved target address. Stage 380 can also include informing the branch prediction unit that the branch prediction was erroneous.

Stage 380 is restricted to sending up to one an instruction fetch command per execution cycle.

Stage 380 can be followed by stage 390 of flushing instructions that followed the mispredicted branch instruction. A mispredicted branch instruction is a conditional branch instruction that was erroneously predicted by the branch prediction unit.

Stage 390 can include storing intermediate results of executions of instructions of the groups of instructions that differ from the mispredicted conditional branch command.

Method 300 can include sending the instruction fetch command to the fetch unit even if the branch prediction was correct.

Figure 4:
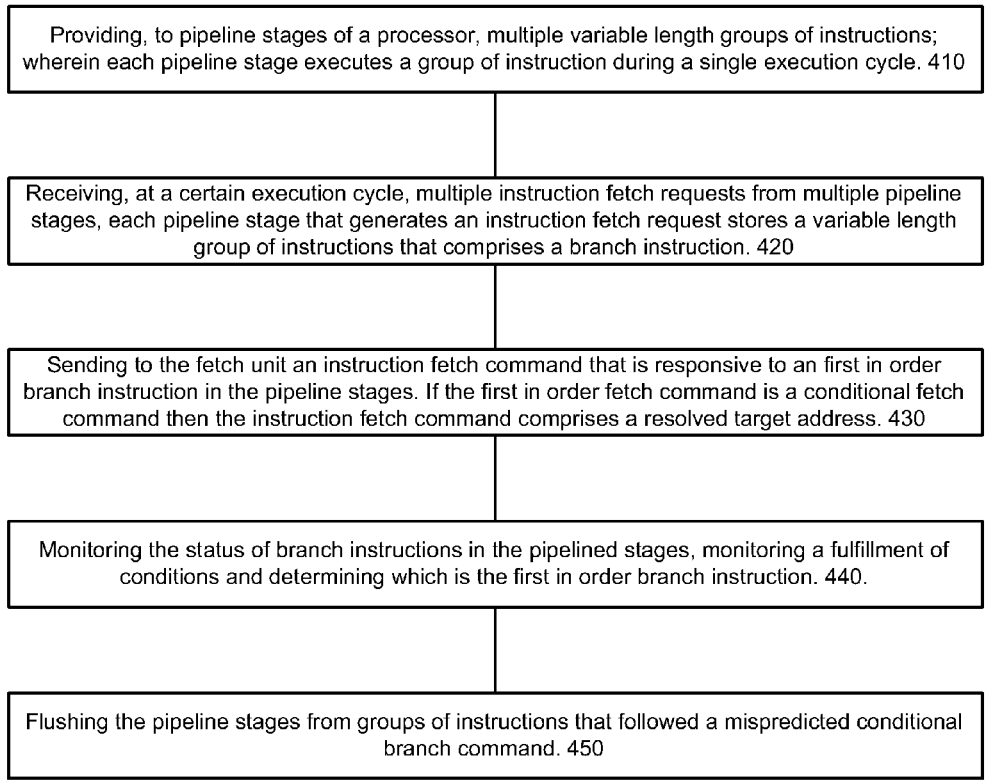
FIG. 4 schematically shows an example of an embodiment of a method.

FIG. 4 schematically shows an example of an embodiment of method 400.

Method 400 starts by stage 410 of providing, to pipeline stages of a processor, multiple variable length groups of instructions; wherein each pipeline stage executes a group of instruction during a single execution cycle.

Stage 410 is followed by stage 420 of receiving, at a certain execution cycle, multiple instruction fetch requests from multiple pipeline stages, each pipeline stage that generates an instruction fetch request stores a variable length group of instructions that comprises a branch instruction.

Stage 420 is followed by stage 430 of sending to the fetch unit an instruction fetch command that is responsive to a first in order branch instruction in the pipeline stages. If the first in order fetch command is a conditional fetch command then the instruction fetch command comprises a resolved target address. Stage 430 of sending of the instruction fetch command is restricted to a single instruction fetch command per a single execution cycle.

Stage 430 can include at least one of the following stages or a combination thereof: (i) sending to the fetch unit the resolved target address and a branch prediction indication that is indicative of a correctness of a predicted target address that was generated by a branch prediction unit; and (ii) sending the instruction fetch command to the fetch unit if a predicted target address associated with the first in order branch command was erroneous.

Method 400 also includes stage 440 of monitoring the status of branch instructions in the pipelined stages, monitoring a fulfillment of conditions and determining which the first in order branch instruction is. Stage 440 can include associating with each branch instruction in the pipeline stages a number of preceding branch instructions that are stored in the branch prediction unit. The outcome of stage 440 (which is the first in order branch instruction) can be used during stage 430, as illustrated by a dashed arrow that connects stages 430 and 440.

Stage 420 can include receiving, at a certain execution cycle, a plurality of instruction fetch requests from a plurality of pipeline stages that store a plurality of branch requests; wherein the plurality of branch instruction fetch requests are associated with the same condition. In this case stage 440 can include storing a resolved condition indication until all branch instructions exit the pipeline stages.

If a predicted target address associated with the first in order branch command was erroneous then method 400 can be followed by stage 450 of flushing the pipeline stages from groups of instructions that followed a mispredicted conditional branch command. Stage 450 can include storing intermediate results of executions of the flushed groups of instructions.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for managing branch instructions, the method comprising:
    providing, to pipeline stages of a processor, multiple variable length groups of instructions; wherein each pipeline stage executes a group of instructions during a single execution cycle;
    receiving, at a controller during a certain execution cycle, multiple instruction fetch requests from multiple pipeline stages, each pipeline stage of the multiple pipeline stages that provides an instruction fetch request to the controller stores a variable length group of instructions that comprises a branch instruction;
    updating status information indicative of an order of branch instructions stored in the multiple pipeline stages based on an executed branch instruction of an immediately preceding execution cycle, wherein the status information for each of the multiple branch instructions includes a bit set for each branch instruction that precedes that branch instruction;
    determining a first in order branch instruction based on the status information wherein the first in order branch instruction has zero bits set in the status information; and
    sending, from the controller, to a fetch unit a certain instruction fetch command that is responsive to the first in order branch instruction of the multiple instruction fetch requests from the multiple pipeline stages, wherein the controller will always send an instruction fetch command responsive to the first in order branch instruction of the multiple instruction fetch requests for a cycle during which the controller receives the multiple instruction fetch requests.

2. The method according to claim 1 comprising sending to the fetch unit a resolved target address and a branch prediction indication that is indicative of a correctness of a predicted target address that was generated by a branch prediction unit.

3. The method according to claim 2 comprising:
    receiving, at a certain execution cycle, a plurality of instruction fetch requests from a plurality of pipeline stages that store a plurality of branch requests; wherein the plurality of branch instruction fetch requests are associated with the same condition; and
    storing a resolved condition indication until all branch instructions exit the pipeline stages.

4. The method according to claim 2 comprising associating with each branch instruction in the pipeline stages a number of preceding branch instructions that are stored in the branch prediction unit.

5. The method according to claim 2 comprising restricting each variable length group of instructions to include less than two branch instructions.

6. The method according to claim 1 comprising sending the certain instruction fetch command to the fetch unit if a predicted target address associated with the first in order branch command was erroneous.

7. The method according to claim 6 comprising:
receiving, at a certain execution cycle, a plurality of instruction fetch requests from a plurality of pipeline stages that store a plurality of branch requests; wherein the plurality of branch instruction fetch requests are associated with the same condition; and
storing a resolved condition indication until all branch instructions exit the pipeline stages.

8. The method according to claim 1 comprising associating with each branch instruction in the pipeline stages a number of preceding branch instructions that are stored in the branch prediction unit.

9. The method according to claim 1 comprising restricting each variable length group of instructions to include less than two branch instructions.

10. The method according to claim 1 comprising:
receiving, at a certain execution cycle, a plurality of instruction fetch requests from a plurality of pipeline stages that store a plurality of branch requests; wherein the plurality of branch instruction fetch requests are associated with the same condition; and
storing a resolved condition indication until all branch instructions exit the pipeline stages.

11. The method according to claim 1 wherein the first in order branch instruction is determined by monitoring and updating status vectors that indicate a number of branch instructions that precede each branch instruction.

12. The method according to claim 1 further comprising:
determining that the first in order branch instruction is a mispredicted branch instruction;
flushing instructions in the pipeline stages that follow the mispredicted branch instruction; and
storing results of the execution of the flushed instructions that follow the mispredicted branch instruction for later use when the flushed instructions are later retrieved by the fetch unit.

13. A system for managing branch instructions, the system comprising:
multiple pipeline stages of a processor, each adapted to execute a single variable length group of instructions per execution cycle;
a fetch unit adapted to fetch groups of variable length instructions from a memory unit; and
a controller, configured to:
receive, at a certain execution cycle, multiple instruction fetch requests from multiple pipeline stages, each pipeline stage of the multiple pipeline stages that provides an instruction fetch request to the controller stores a variable length group of instructions that comprises a branch instruction;
update status information indicative of an order of branch instructions stored in the multiple pipeline stages based on an executed branch instruction of an immediately preceding execution cycle, wherein the status information for each of the multiple branch instructions includes a bit set for each branch instruction that precedes that branch instruction;
determine a first in order branch instruction based on the status information, wherein the first in order branch instruction has zero bits set in the status information; and
send to the fetch unit an instruction fetch command that is responsive to the first in order branch instruction of the multiple instruction fetch requests from the pipeline stages, wherein the controller always executes the first in order branch instruction during each execution cycle;
wherein only if the first in order fetch command is a conditional fetch command then the instruction fetch command comprises a resolved target address;
wherein the controller is restricted to send up to a single instruction fetch command per a single execution cycle.

14. The system according to claim 13 wherein the controller is adapted to send to the fetch unit the resolved target address and a branch prediction indication that is indicative of a correctness of a predicted target address that was generated by a branch prediction unit.

15. The system according to claim 13 wherein the controller is adapted to send the instruction fetch command to the fetch unit if a predicted target address associated with the first in order branch command was erroneous.

16. The system according to claim 13 wherein the controller is adapted to associate with each branch instruction in the pipeline stages a number of preceding branch instructions that are stored in the branch prediction unit.

17. The system according to claim 13 wherein each variable length group of instructions is restricted to include less than two branch instructions.

18. The system according to claim 13 wherein the pipeline stages are adapted to be flushed of instructions that followed a mispredicted conditional branch command while send to storage intermediate results of executions of the flushed groups of instructions.

19. The system according to claim 13 wherein the controller is adapted to:
receive, at a certain execution cycle, a plurality of instruction fetch requests from a plurality of pipeline stages that store a plurality of branch requests; wherein the plurality of branch instruction fetch requests are associated with the same condition; and
store a resolved condition indication until all branch instructions exit the pipeline stages.

20. A method for managing branch instructions, the method comprising:
providing, to pipeline stages of a processor, multiple variable length groups of instructions; wherein each pipeline stage executes a group of instructions during a single execution cycle;
receiving, at a controller during a certain execution cycle, multiple instruction fetch requests from multiple pipeline stages, each pipeline stage of the multiple pipeline stages that provides an instruction fetch request to the controller stores a variable length group of instructions that comprises a branch instruction;
updating status information indicative of an order of branch instructions stored in the multiple pipeline stages based on an executed branch instruction of an immediately preceding execution cycle, wherein the status information for each of the multiple branch instructions includes a bit set for each branch instruction that precedes that branch instruction;

determining a first in order branch instruction based on the status information, wherein the first in order branch instruction has zero bits set in the status information;

sending, from the controller, to the fetch unit an instruction fetch command that is responsive to the first in order branch instruction in the pipeline stages;

determining that the first in order branch instruction is a mispredicted branch instruction;

flushing instructions in the pipeline stages that follow the mispredicted branch instruction; and storing results of the execution of the flushed instructions that follow the mispredicted branch instruction for later use when the flushed instructions are later retrieved by the fetch unit.

\* \* \* \* \*

UNITED STATES PATENT AND TRADEMARK OFFICE
CERTIFICATE OF CORRECTION

| | | |
|---|---|---|
| PATENT NO. | : 8,533,441 B2 | Page 1 of 1 |
| APPLICATION NO. | : 12/190291 | |
| DATED | : September 10, 2013 | |
| INVENTOR(S) | : Peled et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1286 days.

Signed and Sealed this
Tenth Day of March, 2015

Michelle K. Lee
*Deputy Director of the United States Patent and Trademark Office*